Aug. 7, 1951  W. F. PETER ET AL  2,563,418
REMOVABLE FLOOR CONVEYER FOR TRAILERS
Filed July 28, 1949  4 Sheets-Sheet 1

INVENTORS
WILLIAM F. PETER &
W. J. MANGELS
BY
J. Ledermann
ATTORNEY

Aug. 7, 1951    W. F. PETER ET AL    2,563,418
REMOVABLE FLOOR CONVEYER FOR TRAILERS
Filed July 28, 1949    4 Sheets-Sheet 3
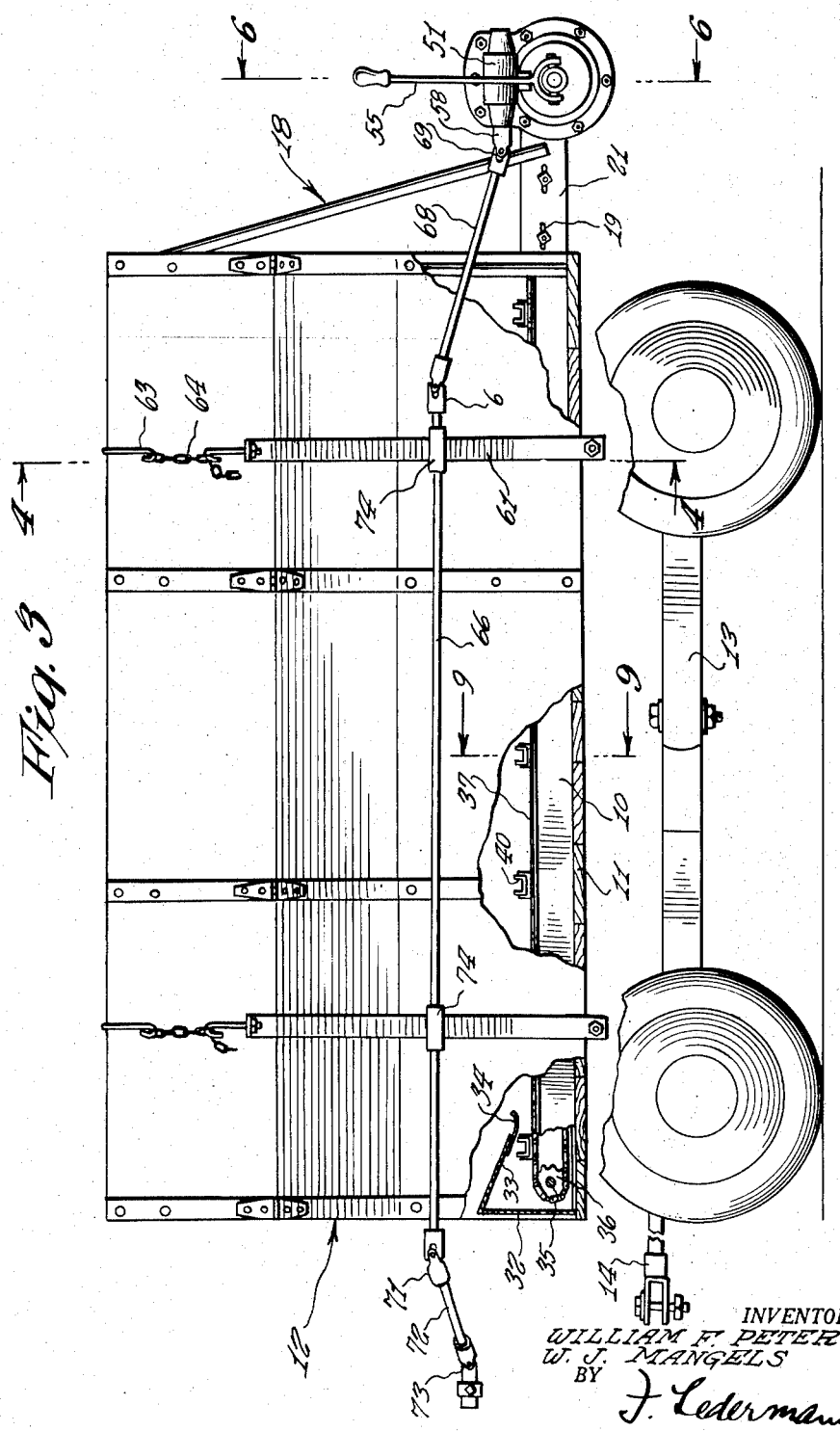
Fig. 3
INVENTORS
WILLIAM F. PETER &
W. J. MANGELS
BY
ATTORNEY Aug. 7, 1951  W. F. PETER ET AL  2,563,418
REMOVABLE FLOOR CONVEYER FOR TRAILERS
Filed July 28, 1949  4 Sheets-Sheet 4
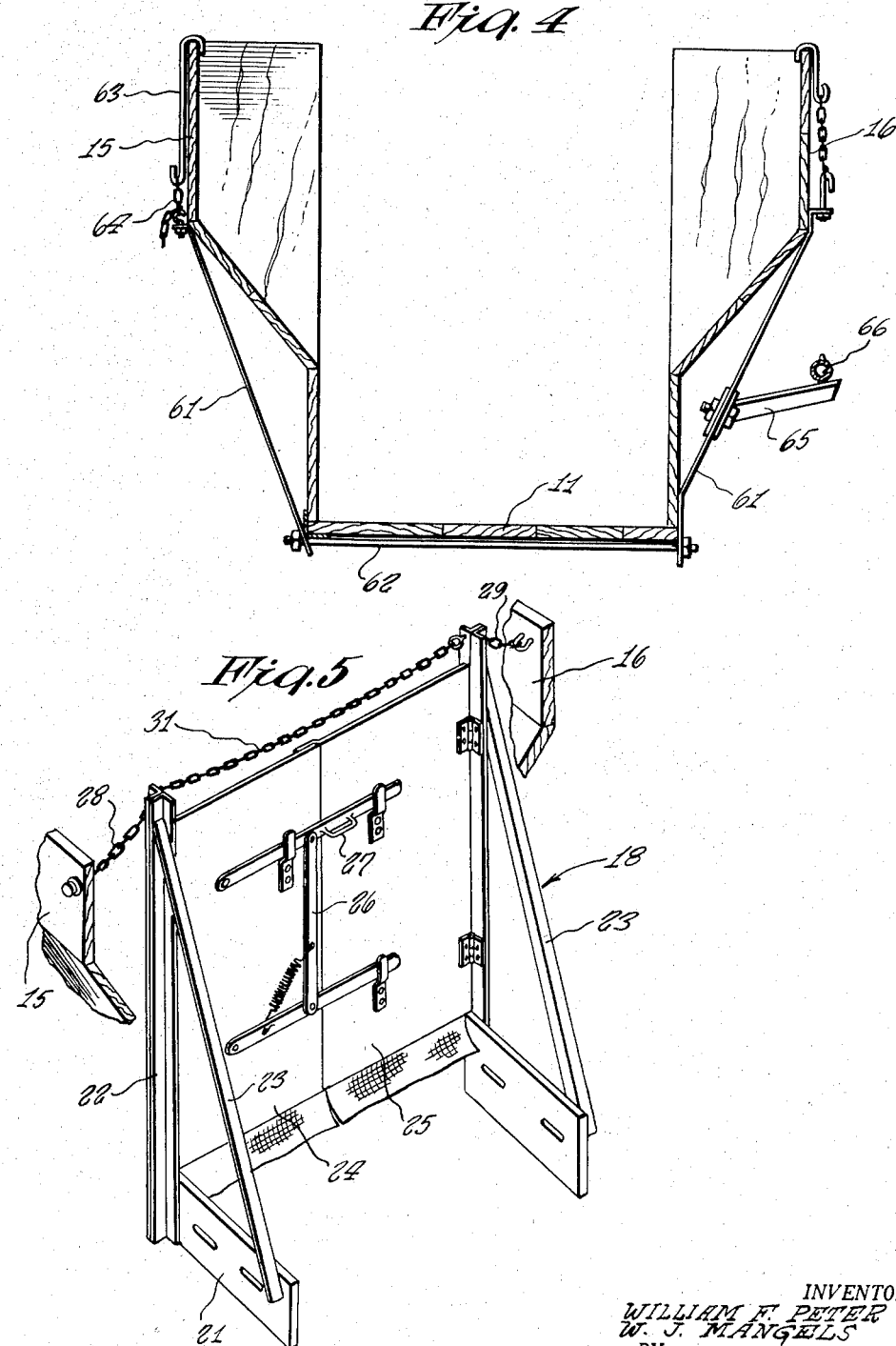
INVENTORS
WILLIAM F. PETER &
W. J. MANGELS
BY
J. Ledermann
ATTORNEY Patented Aug. 7, 1951

2,563,418

UNITED STATES PATENT OFFICE 2,563,418

REMOVABLE FLOOR CONVEYER FOR TRAILERS

William F. Peter, Dempster, S. Dak., and Walter J. Mangels, Le Center, Minn.

Application July 28, 1949, Serial No. 107,344

1 Claim. (Cl. 214—83.36)

This invention relates to a portable wagon box bed conveyor or unloading device.

It is the principal object of the present invento provide a novel, useful and practical power driven portable wagon box bed conveyor for farm wagons adapted to rest on the wagon box under its own weight and without the necessity of having to fasten the same to the box in any manner.

It is an object of the present invention to provide a portable wagon box bed conveyor or unloading device of the type adapted for farm wagons wherein the power for the driving of the conveyor is taken from a tractor forwardly of the wagon and is controlled from the rear end of the wagon by a clutch device which can be operated at that location.

It is another object of the present invention to provide a portable wagon box conveyor device for wagons whereby to do away with the necessity of hoisting the front of the wagon in order to unload it and to eliminate shoveling and to save time in the unloading of wagons.

It is another object of the present invention to provide a portable conveyor for farm wagons in which the speed of operation of the conveyor can be controlled by the tractor throttle to which the conveyor is attached for operation and so that the unloading of the wagon is constantly under the control of the operator by the provision of a clutch lever located at the rear of the wagon.

Other objects of the present invention are to provide a portable wagon conveyor or discharge device which is of simple construction, inexpensive to manufacture, easy to install upon the wagon, has a minimum number of parts, easy to control and efficient in operation.

For other objects and for a better understanding of the invention, reference may be had to the following detailed description taken in connection with the accompanying drawing, in which Fig. 1 is a perspective view of the conveyor structure adapted to be extended into a wagon to be supported therefrom and which forms a unitary structure.

Fig. 3 is a vertical view of a wagon with the unloading device of the present invention disposed therein.

Fig. 4 is a sectional view taken through the wagon and generally on line 4—4 of Fig. 3.

Fig. 5 is a perspective view of the rear door construction forming a part of the conveyor device and assembled therewith upon the wagon.

Fig. 6 is an enlarged sectional view taken generally on line 6—6 of Fig. 3.

Fig. 7 is an enlarged fragmentary view of a portion of the conveyor chain showing the integral formation of one of the links with the transverse conveying pieces.

Fig. 8 is an enlarged fragmentary view looking upon the rear portion of the conveyor and upon the return skids for the conveyor apron.

Fig. 9 is a vertical sectional view taken on line 9—9 of Fig. 3.

Figure 1:
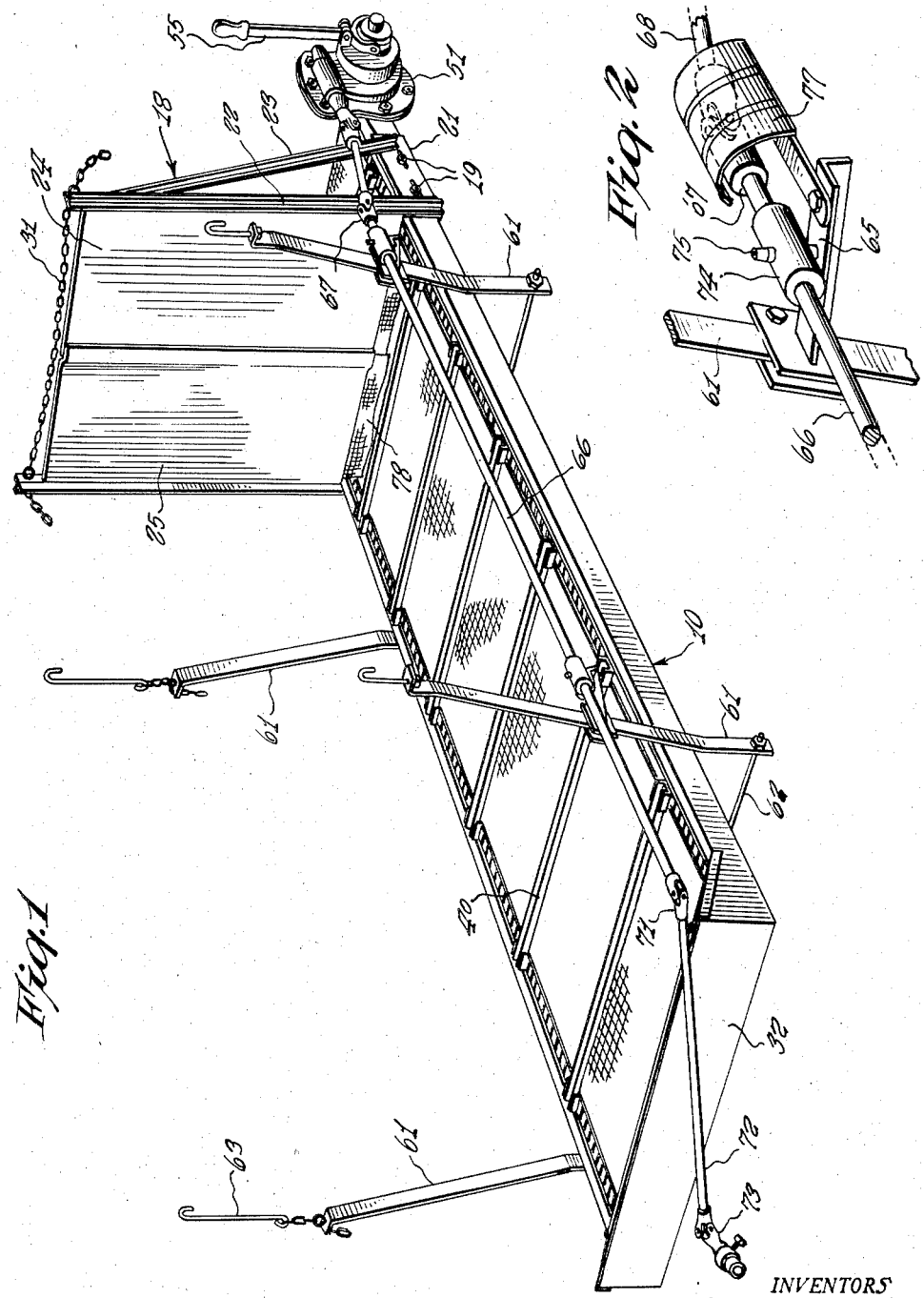

Referring now to the figures, 10 represents a base frame adapted to be disposed on floor 11 of a wagon 12. The wagon has the usual wheeled carriage 13 with a forwardly extending tongue 14 and vertical sides 15 and 16. The frame 10 comprises side pieces formed of channel iron section and having rear holes 17 to which a rear door construction, indicated generally at 18, can be attached to form a part of the conveyor unit. The rear door arrangement is connected to the side frame pieces by clamping bolts 19 extending through a bottom side plate 21 thereof and having upstanding vertical supports 22 and 23 joined together at their upper ends. These supports are provided at the opposite sides of the rear door arrangement and to them are hinged doors 24 and 25 which are held in a closed position by a latch mechanism 26 which can be lifted by pulling upwardly upon a handle 27, Fig. 5. The upper ends of the supports 22 can be fixed to the side frame of the wagon through chain connections 28 and 29, Fig. 5. The supports 22 can be held at their upper ends in spaced relationship by a transverse chain 31.

The forward end of the frame 10 has an elevated end piece 32 which has a removable rearwardly and downwardly inclined guard 33, Fig. 3. This guard 33 comprises a metal plate and a canvas webbing riveted to its lower edge. Extending between the forward ends of the frame pieces is a shaft 35 having spaced sprockets 36 thereon adapted to receive sprocket chains 37. These sprocket chains comprise links and certain of the links have an integral inwardly extending portion 39, Fig. 7, to which transversely extending conveyor pushing members 40 are connected by rivets 41.

Extending between the rear frame pieces is a drive shaft 42 having sprockets 43 thereon engaging with the conveyor chains 37. Beneath the rear end of the frame is a transverse support 44 having bearing brackets 45 receiving the shaft 42.

Resting on the transverse support 44, Fig. 8, are longitudinally extending supporting strips 46 and 47 adapted to support the conveyor transverse members 40 on their return movement to the forward part of the wagon. A sheet metal deck 48 is fixed to the top side of frame 10 and the transverse members 40 will ride thereover while discharging the contents of the wagon from the rear thereof. These skids or strips 46 and 47 lie on transverse pieces 49 of the frame 10, which engages the bottom 11 of the wagon, Fig. 9.

Mounted on one end of the frame is a gear box 51 having a helical gear 52 journalled therein. The shaft 42 extends through the helical gear 52 and has a clutch element 53 secured thereto. This clutch element 53 is adapted to be brought into engagement with a clutch portion 54 of the gear 52 by a lever arm 55 pivoted on a bracket 56 of the housing 51. The gear housing 51 is made of separable portions connected together by securing bolts 57. Extending into the housing 51 is a drive shaft 58 connected to a pinion 59 meshed with the gear 52.

Straps 61 are secured together by a shaft 62 running under the floor of the wagon and the upper ends of these straps are connected by hooks 63 and adjustable chain links 64 to the upper edge of the wagon sides, Fig. 4. There are two sets of these straps connected to the wagon. One of the straps supports a bracket 65 in which is journalled a driving shaft 66 extending along the side of the wagon and connected by a universal joint 67 to a shaft 68 which is in turn connected by a universal joint 69 with the gear drive shaft 58.

Figure 2:
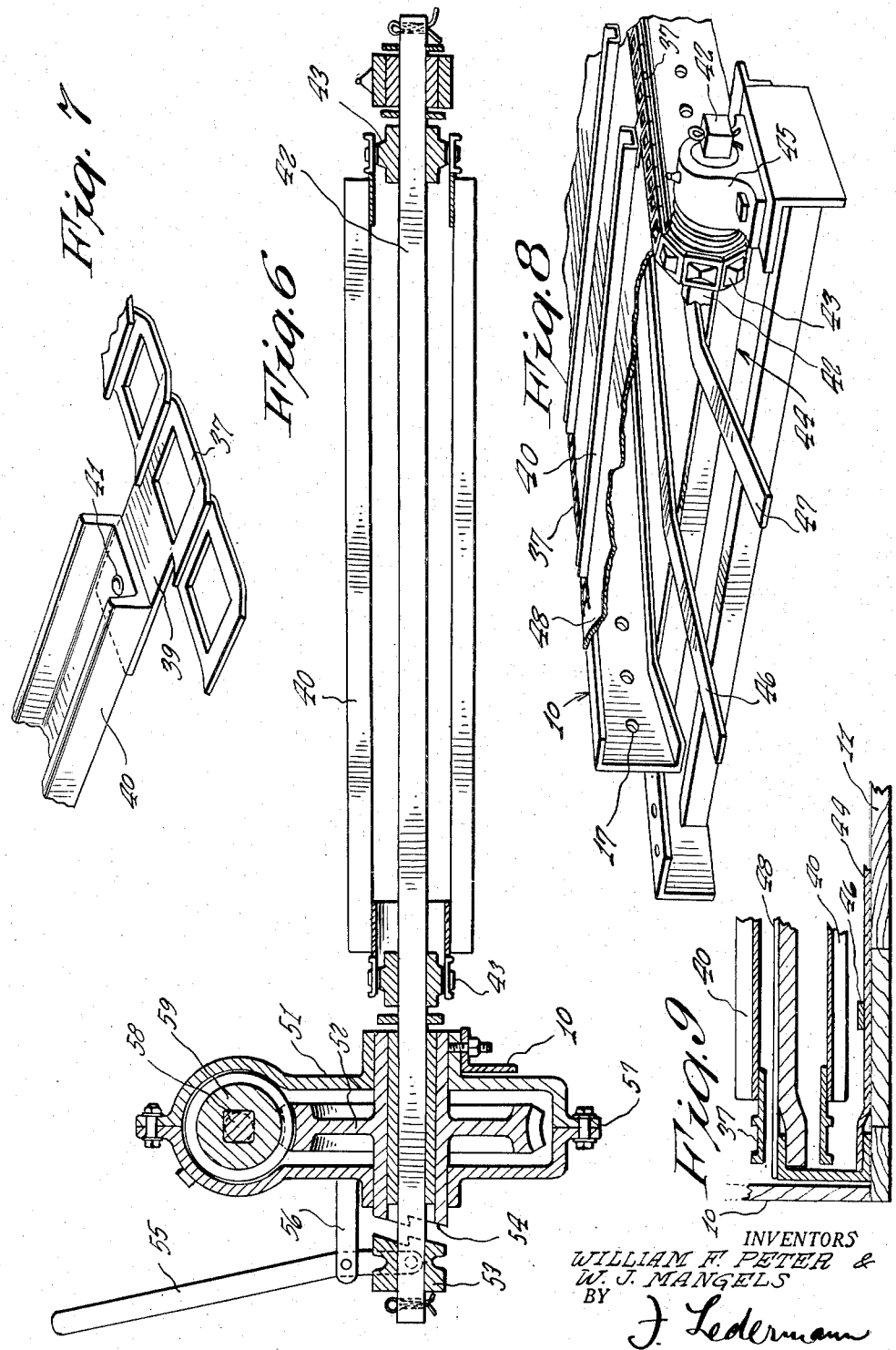
Fig. 2 is a fragmentary perspective view showing the driving coupling and one of the universal connections therein.

The forward end of the shaft 66 has a universal joint 71 which is connected through a shaft 72 with a universal joint fitting 73 adapted to be connected to the power takeoff shaft of a tractor. As shown in Fig. 2, a guard 77 is connected to the bracket 65 to cover the universal joint 67.

Depending from each of the doors 24 and 25 are flexible closure members 78 tending to engage with one of the transverse members 40 and with the sheet metal deck 48. With loose material in the wagon, such as grain, these flexible closure members 78 will prevent the loss of the same. These flexible closure members 78 provide a definite closure of the doors 24 and 25 over the sheet metal deck 48 and so that the doors will be closed regardless of the position of transverse members 40 of the conveyor.

The speed of movement of the conveyor is determined by the speed of the tractor engine and of the power takeoff shaft of the tractor. This speed can be set at a time when the material is being discharged into a hopper so as to give a constant flow of material from the wagon. By operating the clutch, the flow can be stopped independently of the tractor engine. The clutch lever provides a control of the unloading operation independently of the tractor power take off control.

It will be apparent that the arrangement is light in weight and can be easily installed in a wagon in a few minutes and removed as readily as when the wagon is desired for purposes not requiring the use of the conveyor.

It will be further apparent that the conveyor is formed of rugged all metal construction and will have long life. The stout gears running in the oil in the gear casing will stand up indefinitely. It has particular use in unloading ensilage, corn, fodder, grain, chopped hay and for stringing along feed for livestock.

It should also be apparent that there has been provided a conveyor attachment for wagons adapted to be located on the floor of the wagon which can serve for the removing of various articles or matter from the wagon by the simple operation of a lever arm controlling a gear arrangement and wherein the gear arrangement is driven by a shaft extending along the side of the wagon and from the tractor power takeoff.

It should be further apparent that there has been provided a rear door arrangement which can be made a part of the conveyor unit for the wagon. This rear door arrangement is supported directly from the conveyor frame at the rear thereof by clamping bolts. With the doors at the rear of the wagon open and the conveyor caused to move rearwardly, any material lying on the conveyor will be discharged from the rear of the wagon.

While various changes may be made in the detail construction, it shall be understood that such changes shall be within the spirit and scope of the present invention as defined by the appended claim.

What is claimed is:

A portable conveyor or discharge device comprising a frame adapted to be fitted into a wagon, a conveyor sprocket structure connected to the forward part of the frame, a sheet metal deck secured to the top side of the frame, a driving sprocket structure connected to the rear part of the frame, a conveyor extending over the sprocket structures to be driven by the same and over the sheet metal deck, a gear device connected to the rear of the frame and to the rear sprocket to drive the sprocket, said gear device having a clutch arrangement associated therewith, a flexible driving shaft adapted to extend forwardly along the side of the frame and from the gear device and adapted for connection to a power take off of a tractor adapted to pull the wagon, releasable means adapted to support the flexible drive shaft on the sides of the wagon, and a rear door arrangement adapted to be releasably secured to the conveyor frame and having doors adapted to be opened rearwardly to permit the passage of material from the wagon and from the conveyor, said doors having flexible closing members depending respectively from them and adapted to engage the sheet metal deck.

WILLIAM F. PETER.
WALTER J. MANGELS.

REFERENCES CITED

The following references are of record in the file of this patent:

UNITED STATES PATENTS

| Number | Name | Date |
|---|---|---|
| 1,945,532 | Lima | Feb. 6, 1934 |
| 2,082,673 | Williamson | June 1, 1937 |
| 2,462,404 | Kahres et al. | Feb. 22, 1949 |
| 2,489,055 | Steinacher | Nov. 22, 1949 |
| 2,490,241 | Smith et al. | Dec. 6, 1949 |
| 2,496,463 | Gaddis | Feb. 7, 1950 |